US008800363B2

(12) United States Patent
Edvardsson

(10) Patent No.: US 8,800,363 B2
(45) Date of Patent: Aug. 12, 2014

(54) RADAR LEVEL GAUGE WITH DIELECTRIC ROD CONNECTION

(75) Inventor: Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 209 days.

(21) Appl. No.: 12/958,787

(22) Filed: Dec. 2, 2010

(65) Prior Publication Data

US 2012/0137768 A1 Jun. 7, 2012

(51) Int. Cl.
G01F 23/00 (2006.01)
(52) U.S. Cl.
USPC ........................................................ 73/290 V
(58) Field of Classification Search
USPC .............................................. 73/290 R, 290 V
See application file for complete search history.

(56) References Cited

U.S. PATENT DOCUMENTS

| 6,276,199 | B1 * | 8/2001 | Eckert et al. | 73/290 V |
|---|---|---|---|---|
| 6,373,427 | B1 * | 4/2002 | Hohne | 342/128 |
| 6,834,546 | B2 * | 12/2004 | Edvardsson | 73/290 V |
| 7,102,584 | B2 * | 9/2006 | Janitch et al. | 343/785 |
| 7,106,247 | B2 | 9/2006 | Edvardsson | |
| 7,701,385 | B2 * | 4/2010 | Edvardsson | 342/124 |
| 2002/0080080 | A1 | 6/2002 | Kloefer et al. | 343/785 |

FOREIGN PATENT DOCUMENTS

| WO | WO 03/025523 | 3/2003 |
|---|---|---|
| WO | WO 2004/079307 | 9/2004 |
| WO | WO 2009/142595 | 11/2009 |

OTHER PUBLICATIONS

International Search Report for PCT Application No. PCT/EP2011/065362, dated Dec. 1, 2011, 4 pgs.
Written Opinion for International Search Report for PCT Application No. PCT/EP2011/065362, dated Dec. 1, 2011, 7 pgs.

* cited by examiner

*Primary Examiner* — Hezron E Williams
*Assistant Examiner* — David Z Huang
(74) *Attorney, Agent, or Firm* — Westman, Champlin & Koehler, P.A.

(57) ABSTRACT

A radar level gauge using electromagnetic signals to determine a filling level of a product in a tank, comprising an electronics unit including transceiver circuitry, a signal propagation device, and a directional coupler. The gauge further comprises a wave guiding structure comprising a rod of a dielectric material. A mounting portion of the electronics unit defines an opening and is detachably mountable on the dielectric rod so that the rod extends through the opening and is at least partly surrounded by the opening. The mounting portion is further arranged to secure the circuitry portion relative the rod so that the directional coupler is in a position to couple signals between the transceiver circuitry and the rod.
The radar level gauge according to the present invention facilitates replacement of an electronics unit, e.g. in case of malfunction or upgrades. At the same time, the dielectric rod enables a very simple, cost-effective and reliable feeding to and from each electronics unit.

25 Claims, 8 Drawing Sheets

(Prior art) *Fig. 1*

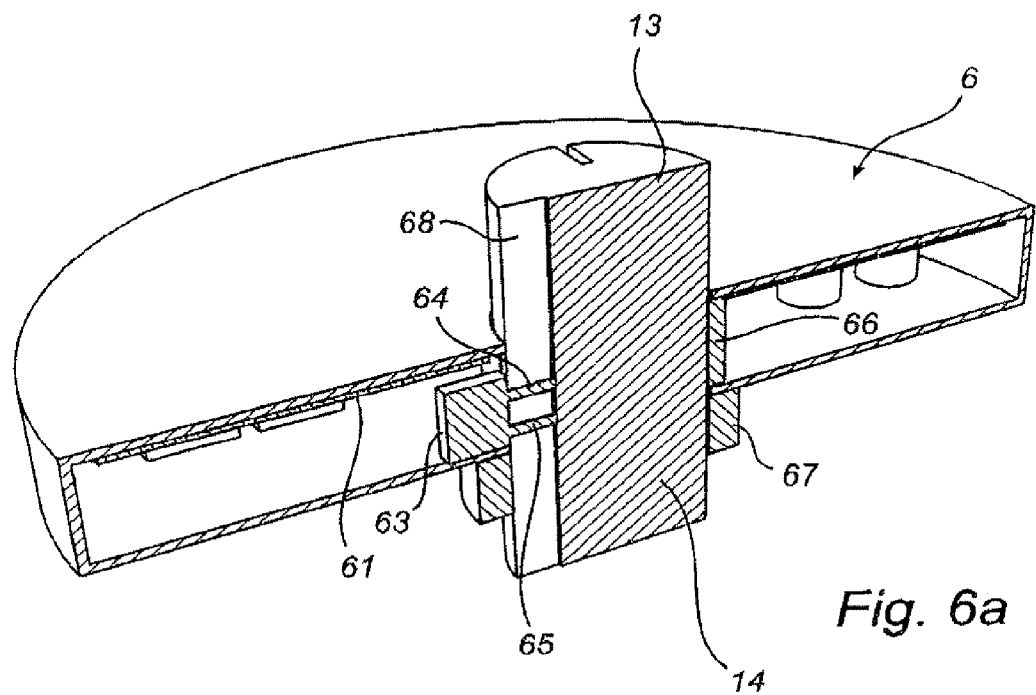
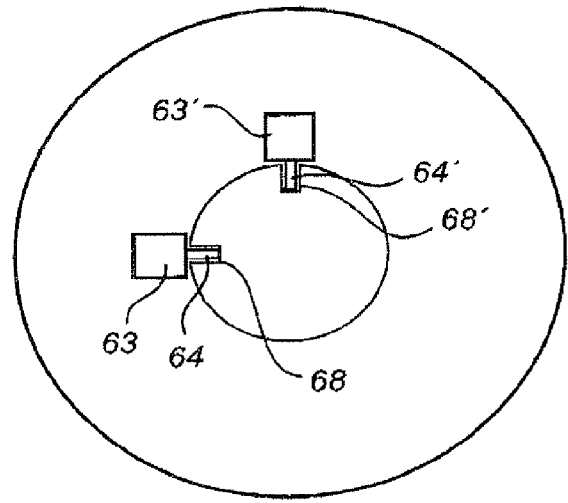
Fig. 6a
Fig. 6b

RADAR LEVEL GAUGE WITH DIELECTRIC ROD CONNECTION

FIELD OF THE INVENTION

The present invention relates to a radar level gauge using electromagnetic waves to determine a filling level of a product in a tank. The gauge comprises an electronics unit including transceiver circuitry for transmitting and receiving electromagnetic waves, and processing circuitry connected to the transceiver circuitry and adapted to determine the process variable based on a relation between transmitted and reflected waves.

BACKGROUND OF THE INVENTION

Radar level gauging (RLG) to measure the level of a filling material, such as a liquid or a solid like a granulate is an increasingly important method for level gauging in tanks, containers, etc. Many different types of RLG systems are previously known. An example of such a systems is disclosed in U.S. Pat. No. 7,106,247 assigned to Rosemount Tank Radar, and includes an antenna inside the tank and an electronics unit containing transceiver circuitry and processing circuitry outside the tank. There are many ways to connect the electronics unit with the antenna in the tank, typically including some sort of wave guiding structure or a coaxial connector, However, in some applications it is useful to arrange the electronics unit of the RLG so as to be easily replaceable and exchangeable. Also, in some applications, it is desirable to connect several electronics units providing functionally independent measuring channels to the same antenna. Independent radar level gauges using the same physical antenna but otherwise electrically independent provides redundancy at a low cost. For example, to connect more than one sensor to one antenna is a very cost effective way to implement a system with a level sensor and an independent overfill alarm, etc, and has gained wide acceptance among users and authorities.

An example of such a system using several channels for feeding one and the same antenna is disclosed in WO 03/025523, assigned to Rosemount Tank Radar. FIG. 1 shows an example of a prior art arrangement of this kind, with three electronics units 101, 102, 103 connected to a waveguide 104 connected to an antenna (not shown). The electronics units are connected to the waveguide by means of a connection device, for example a turnstile junction 105. The electronics units are connected to the connection device using conventional terminals, such as coaxial connectors. One of the electronics units is connected to a first probe 106 coupling energy having a first polarization into the waveguide. The other two electronics units are connected to a second probe 107 via a power divider 108 which is part of the turnstile junction.

Another example is disclosed in U.S. Pat. No. 7,701,385, assigned to Rosemount Tank Radar. In this case, two or more electronics units are combined to form a pineapple slice shape, the hole of which may form part of the wave guide,

GENERAL DISCLOSURE OF THE INVENTION

It is an object of the present invention to provide a radar level gauging system with one or several easily replaceable electronics units connected to the same antenna. According to an aspect of the present invention this object is achieved by a radar level gauge using electromagnetic signals to determine a process variable of a product in a tank, comprising an electronics unit comprising a mounting portion and a circuitry portion including transceiver circuitry for transmitting and receiving electromagnetic signals, processing circuitry connected to the transceiver circuitry and adapted to determine the filling level based on a relation between transmitted and received signals, and a directional coupler. The gauge further comprises a signal propagation device arranged to direct electromagnetic signals into the tank and to return electromagnetic signals reflected from the tank, and a wave guiding structure arranged to guide the electromagnetic signals between the electronics unit and the signal propagation device, the wave guiding structure comprising a rod of a dielectric material. The mounting portion defines an opening and is detachably mountable on the dielectric rod so that the rod extends through the opening and is at least partly surrounded by the opening. The mounting portion is further arranged to secure the circuitry portion relative the rod so that said directional coupler is in a position to couple signals between the transceiver circuitry and the rod.

By "detachably mountable" is intended to mean that the unit may be replaced by a technician in the field, without requiring extensive equipment. The radar level gauge according to the present invention facilitates replacement of an electronics unit, e.g. in case of malfunction or upgrades. Mounting is not critical as there are no metallic connections. Each mounting portion can simply be pushed on or pulled off the dielectric rod. It should be noted that in this case where the tank contains pressurized or toxic contents, and is hermetically sealed from the outside, the electronics unit may detached from the rod under maintained sealing of the tank.

At the same time, the dielectric rod enables a very simple, cost-effective and reliable feeding to and from each electronics unit.

The directional coupler ensures that the transmitted power is directed downwards to the antenna and that reflected power can be received the same way. By the directional coupling structure two, or possibly three, units with the same polarization can be stacked on each other but with an acceptable power loss and assuming there is sufficient distinction of some of the signal parameters. It is noted that polarization typically provides signal isolation of around 18-20 dB, while a directional coupling typically provides signal isolation of around 15-20 dB.

The mounting portion and the circuitry portion may be formed as one integrated unit, even further facilitating any handling of the electronics unit. However, it is also possible to have the mounting portion as a separate element, to which the circuitry portion is attachable. In such a case, it may be possible to detach the circuitry portion from the rod without removing the mounting portion.

According to one embodiment, the dielectric rod is adapted to act as a surface wave guide. In this case, the rod is not surrounded by any conducting enclosure, and this design therefore effectively prevents any gas leakage along the waveguide. In this case, the antenna may be a rod antenna and the dielectric rod may be an extension of the antenna. This provides a mechanically very simple and robust system, Alternatively, the wave guiding structure may further comprise an intermediate transition structure for matching the dielectric rod surface wave guide to a hollow wave guide. A transition to a hollow wave guide may be desirable in connection to certain types of antennas.

By "hollow" waveguide is here intended a waveguide where the conducting material encloses a hollow space, which can be empty or filled with a suitable dielectric material. The hollow waveguide can be tubular with a suitable cross section, and in a preferred embodiment it has a circular cross section.

According to another embodiment the dielectric rod is surrounded by a conducting enclosure so as to form a hollow (but dielectric fined) waveguide. In this case, a wall of the mounting portion delimiting the opening may form part of the conducting enclosure.

The present invention may be useful when several electronics units are connected to the same antenna. In this case, the dielectric rod should have a length allowing several electronics units to be arranged along the rod on top of each other. The units are thus stacked on top of each other in the axial direction of the rod. The units may rest on each other, or be separated by suitable distance element(s), or be secured at desired locations by means of suitable fastening elements.

Each electronics unit may provide a functionally independent measurement channel. For example, in radar level gauging systems for tank ships, at least one overfill alarm that is functionally independent of the level measuring system is required. Functional independence here means that a fault in one channel should not make another channel inoperable, so that a level measurement may still be performed in the other channel.

A channel is here defined as all the electronics, including microwave transmitter and receiver, that is needed to generate, transmit, distribute and receive the microwave signals up to the microwave waveguide. Such independence can be achieved by ensuring that there are no common electrical circuits and cabling. However, fixed mechanical constructions for example, which cannot normally go wrong, may be shared.

The microwave signals used in the separate channels must be distinguishable from each other. This may be arranged by generating microwave signals for the different channels to have, for example, different polarization, different modulation, different frequencies or being separated in time.

In order to ensure functional independence, each electronics unit may be electronically and galvanically separated from other electronics units. The expression electronically and galvanically separated should here be understood to mean that the electronic units are electrically separated and isolated from each other. Typically, but not necessarily, the electronic units are also formed as physically individual units, that are individually mounted on the dielectric rod.

Two electronics units may be arranged to transmit waves having different polarization to enable separation of channels. For example, two electronics units, adapted to transmit linearly polarized radiation may be rotated 90 degrees with respect to each other. This ensures that electromagnetic waves emitted from a first of these electronics units have a polarization orthogonal to electromagnetic waves transmitted from a second of these electronics units.

If circular polarization is implemented, reflected waves will have an opposite polarization compared to the emitted waves due to the reflection in the surface interface. In this case, therefore, all units will typically transmit in the same polarization (e.g. RHCP) and receive in the same polarization (e.g. LHCP). Separation of channels will then be accomplished by the directional coupling and possibly by additional distinguishable features.

In some cases, for example when more than two electronics units are connected to the rod, electromagnetic waves transmitted from a first electronics unit may be distinguishable from electromagnetic waves transmitted from a second electronics unit by means of a feature other than polarization. Examples of such features comprise timing, separated frequency ranges, frequency modulation, etc.

In a situation where three electronics units are arranged on the rod, they may be rotated 120 degrees with respect to each other. This enables separation of the channels using a combination of polarization and at least one other distinguishable feature.

BRIEF DESCRIPTION OF THE DRAWINGS

The present invention will be described in more detail with reference to the appended drawings, showing currently preferred embodiments of the invention.

FIGS. 4-6 shows various examples of couplings between the electronics unit suitable for the radar level gauges in FIGS. 2 and 3.

DETAILED DESCRIPTION OF PREFERRED EMBODIMENTS

Figure 2:
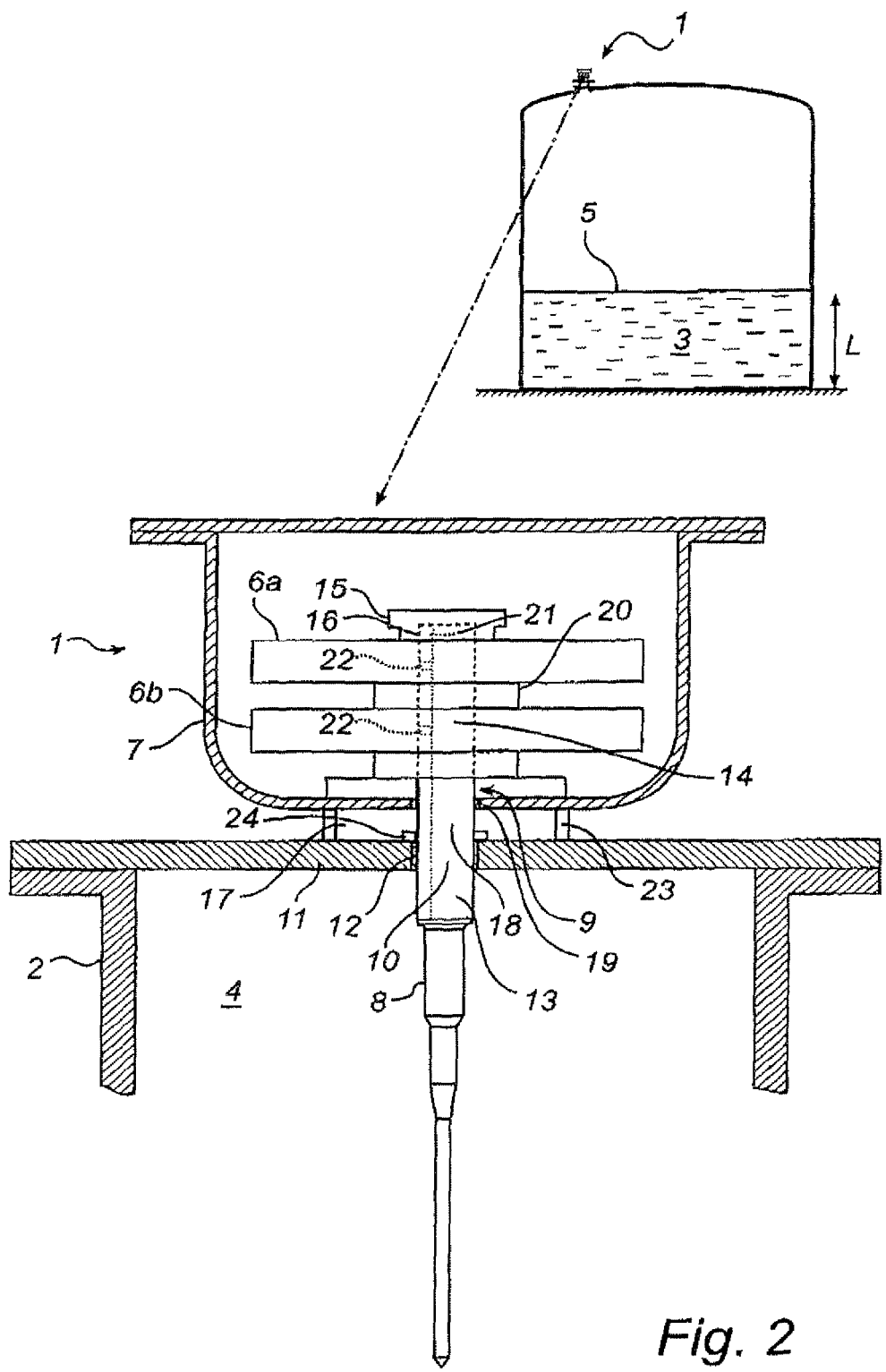
FIG. 2 shows a plane view of a radar level gauge implmenting a first embodiment of the present invention.

FIG. 2 shows schematically a radar level gauge 1 according to an embodiment of the present invention, mounted to the roof of a tank 2.

In brief, the gauge 1 is an exemplary radar level gauge for determining a filling level L of a filling material 3 contained in the tank 2. The filling material 3 may be products such as oil, refined products, chemicals and liquid gas, or may be a solid material in powder or granular form, such as grain, pellets or coal. The tank 2 may be stationary or arranged on a moving vehicle, such as on a tanker. The working principle of the gauge is to transmit microwave signals into the tank and to receive reflected signals from the tank. The microwave signals are reflected by an interface between the filling material and surrounding atmosphere 4 (i.e. the upper surface 5 of the filling material), or between different filling materials (e.g. oil and water). The reflected signal is analyzed to determine the distance to such an interface.

The radar level gauge 1 comprises one or several, in the illustrated case two, electronics units 6, 6a, 6b, described in more detail with reference to FIGS. 4-6. The electronics unit comprises a circuitry portion including transceiver circuitry for transmitting and receiving microwave signals and processing circuitry for determining the filling level of the container based on received signals reflected from the tank.

The electronics units 6a, 6b, as well as any additional circuitry such as communication interface and power supply and/or power management circuitry (not shown), are surrounded by a housing 7, preferably providing an airtight sealing of the circuitry.

The system further comprises an antenna 8 arranged inside the tank 2 for transmitting microwave signals into the tank 2 and receiving reflected signals, and a wave guiding structure 9 for guiding microwave signals between the electronics units 6a, 6b and the antenna 8. The antenna 8 may be used both as a transmitter for emitting the output electromagnetic waves and as a receiver for receiving the reflected echo signals. The antenna 8 in FIG. 2 is a rod antenna. However, other types of antennas or signal propagation devices can be used as well, including free propagating antennas such as a horn antenna (see FIG. 3), a fixed or movable parabolic antenna, a conical antenna, and wave guides, such as a still pipe, a transmission line or probe.

The radar level gauge 1 is typically arranged outside the tank 2, and the wave guiding structure 9 then protrudes into the container through a hole 10 in a mounting structure 11 mounted in the roof of the tank 2. If required, the opening 10 is provided with a sealing 12, arranged to allow the electromagnetic signals to pass through the wall of the container while maintaining an air tight seal, so as to prevent container contents from escaping from the container.

The wave guiding structure 9 comprises a rod 13 of a dielectric material, extending from the electronics unit 6 towards the antenna 8. Each electronics unit 6 has a mounting portion, defining an opening 14 making it detachably mountable on the rod 13. In the illustrated case, the mounting portion is formed by the housing itself. For example, as in the illustrated case, the unit 6 can be annular, with a central opening 14. The dielectric rod 13 is not necessarily completely surrounded by the unit 6a, 6b, which may have for example a partially annular shape.

Alternatively, the mounting portion is a separate component, for example in the form of a ring, and the circuitry portion of the electronics unit is then attached, possibly releasably, to the mounting portion.

The unit 6a is mounted on the rod 13, so that the rod 13 extends through the opening 14. In the illustrated case, the opening 14 in the unit 6a surrounds the rod 13, and the unit 6a is thus mounted from the top onto the rod 13. If the relative rotation of the units 6a is important, such as in the case of orthogonal polarizations, the orientation of the units may preferably be ensured by suitable guiding means. As illustrated in FIG. 2, the rod 13 may for example be provided with groves 21 in its axial direction, and the units 6a, 6b may be provided with protrusions 22 fitting in these grooves.

Figure 8:
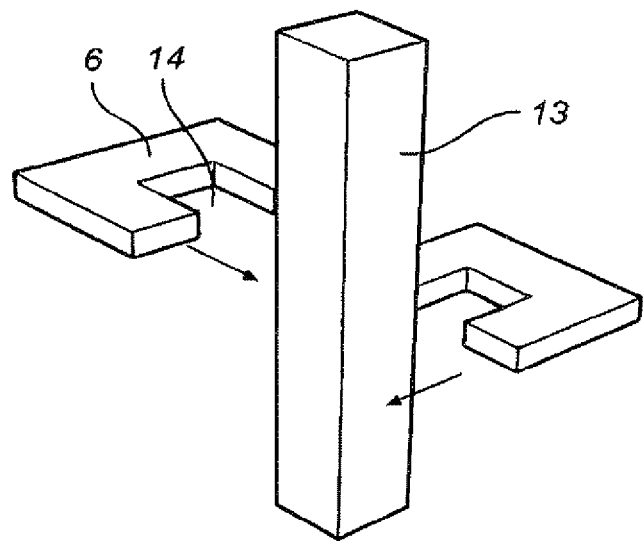
FIG. 8 shows schemically a geometric design of an electronics unit according to a further embodiment of the present invention.

In the case of an opening 14 which only partially surrounds the rod 13, the unit 6 may alternatively be mounted from the side. This is possible for example in the case with a rod 13 having a square or rectangular cross section, and a unit 6 with a rectangular opening located in one of its sides. This is illustrated in FIG. 8. One advantage with this embodiment is that a relative rotation between the electronics units 6a, 6b of 90 degrees can be easily ensured by mounting the units from different sides of the rectangular rod 13.

The electronics units 6a, 6b are arranged to direct electromagnetic waves, e.g. microwave signals, into the rod 13, and receive reflected signals. For this purpose, the unit 6a, 6b may be provided with a directional coupler connected to the transceiver circuitry, and adapted to couple transmitted microwave signals into the dielectric rod 13 extending through the opening 14 and to out-couple reflected microwave signals from the dielectric rod 13. This will be described in more detail below with reference to FIGS. 4-6.

In order to provide several level measurements, independent of each other, several electronics units 6a, 6b may be arranged on the rod 13. Each unit 6a, 6b is then arranged to transmit microwave signals on a separate channel, i.e. the signals from different units 6a, 6b are distinguishable from each other, and do not interfere with each other.

Suitable matching may be provided between the electronics units 6a, 6b, Such matching may be formed as a tube or sleeve of a dielectric or metal material mounted on the rod 13 between two adjacent units 6a, 6b, and will be described in more detail with reference to FIGS. 4-6 below. Such sleeves may be separate from the units 6 or integrated therewith.

As the dielectric rod in FIG. 2 is arranged to act as a surface wave guide, it is not enclosed by any conducting sleeve. The insides of the openings 14 may be open or closed by a suitable dielectric wall. In order to separate the units 6a, 6b from each other by a suitable distance, a distance element 20, such as a plastic ring or sleeve, may be arranged between adjacent units 6a, 6b. This will be described in more detail with reference to FIGS. 4 and 5.

A wave guide termination 15 may be arranged in a distal end 16 of the rod 13 with respect to the antenna 8. The termination 15 is adapted to dampen, or absorb, the microwave energy that reaches the distal end 16 of the rod 13, so as to avoid a reflection in the end causing a possible interfering echo to be received by the electronics units 6a, 6b. The termination 15 may also be adapted to lock, or fixate, the electronics units 6a, 6b that are mounted on the rod 13.

Figure 3:
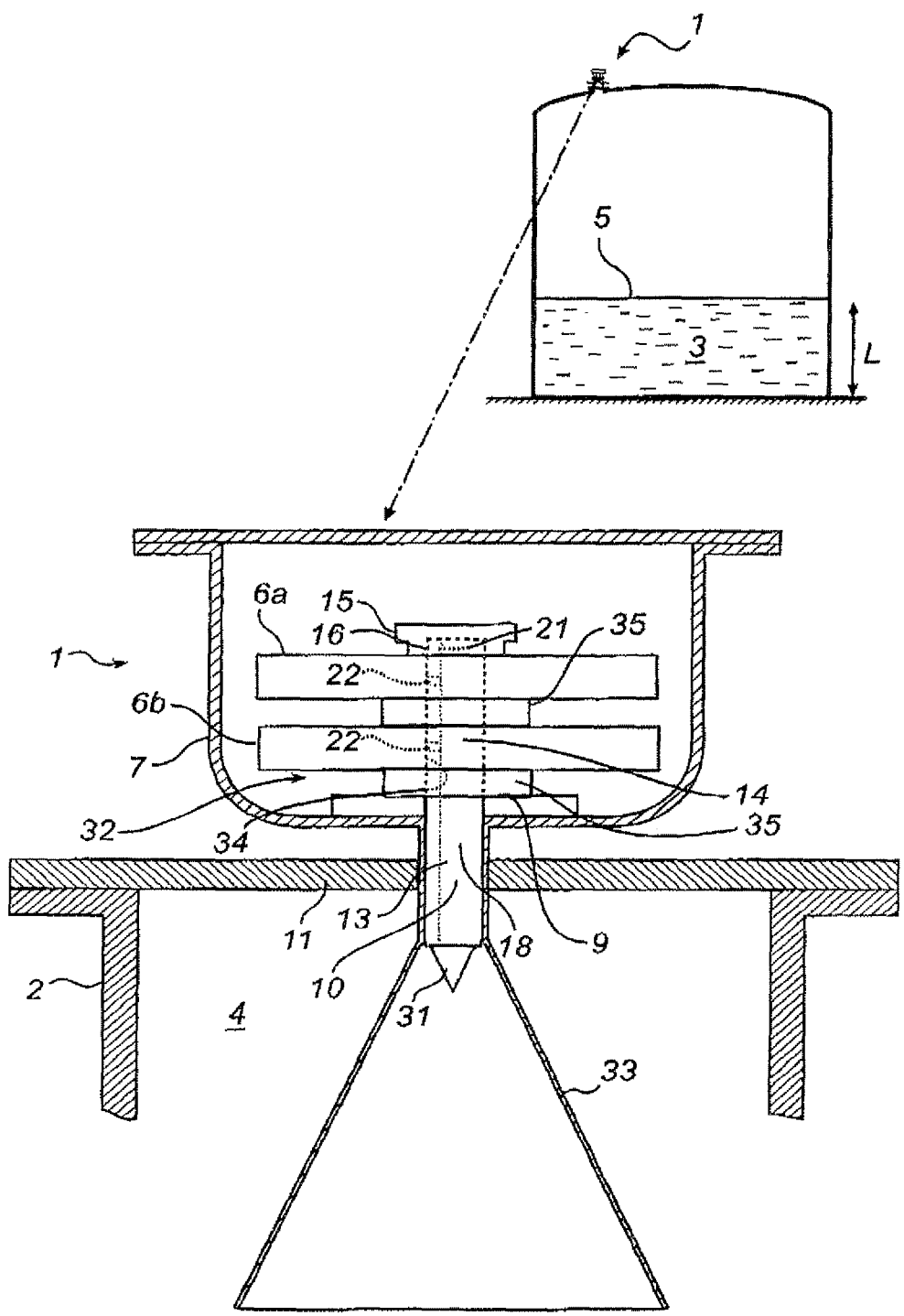
FIG. 3 shows a plane view of a radar level gauge implmenting a second embodiment of the present invention.

When, as in the embodiment illustrated in FIG. 2, the antenna 8 is a rod antenna, the dielectric rod 13 may be simply an extension of the antenna. In other cases, as will be illustrated in FIG. 3 depicting a horn antenna, or in case of a parabolic antenna, the wave guiding structure 9 may advantageously include an intermediate transition structure, arranged between the rod and a different type of wave guide.

Further, the dielectric rod 13 may extend through a ventilated space 17 between the tank 2 and the housing 7. The rod 13 then passes through an opening 18 in the bottom wall of the housing 7 into the ventilated space 17, and then continues into the tank 2. Just like the opening 10 in the tank 2, the opening 18 may be sealed by a sealing 19, allowing passage of electromagnetic signals but protecting the electronics inside from the outside environment. The ventilated space 17 may be formed for example by a perforated ring 23 attached to the roof of the tank 2 and supporting the housing 7. Alternatively, the ring 23 may be replaced by other suitable suiports, such as pins, that automatically create a ventilated space.

Adjacent to the tank opening 10, a suitable matching element 24 may be arranged, to ensure matching between surrounding conducting material having different thickness.

Figure 9:
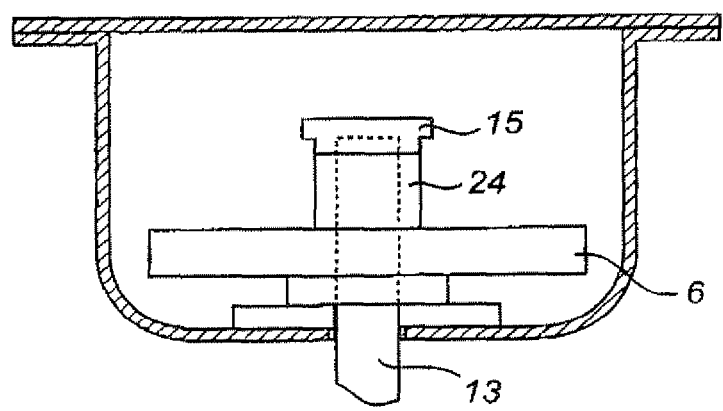
FIG. 9 shows schematically an embodiment with only one electronics unit.

It should be noted that one of the units 6a, 6b may be replaced by an annular distance element having approximately the same thickness as the electronics unit. This may be advantageous for example if the rod 13 is manufactured in a standard length adapted for two units. The annular element 25 can then be mounted on the rod 13 below or above a unit 6 so as to create the same total axial extension, thereby still allowing the termination 15 to lock the unit 6. This is illustrated in FIG. 9.

The basic principle of the radar level gauge illustrated in FIG. 3 is similar to that illustrated in FIG. 2. However, in this case, the antenna 33 is a horn antenna, and the dielectric rod 13 here forms the filling of a hollow wave guide 32.

By "hollow" waveguide is intended a waveguide where the conducting material encloses a hollow space, which can be empty or filled with a suitable dielectric material. Electromagnetic waves are guided across the entire cross section of a hollow wave guide. In a preferred embodiment the cross section is 90-degree symmetrical, e.g. an essentially circular cross-section.

In the illustrated example, the rod 13 extends all the way to the antenna 33, and ends at the upper end of the horn. The lower tip 31 of the rod is pointed, to form a matched transition between the wave guide and the antenna. The horn of the antenna may further be sealed by a dielectric material (not shown). Alternatively, the wave guide structure 9 may include a transition to a different type of hollow wave guide, such as an empty hollow wave guide.

In FIG. 3, the opening 14 of each electronics unit 6a, 6b has an inner wall 34 of conducting material, and any distance elements 35 are also formed with an inner wall, facing the rod, made of a conducting material. As a result, the dielectric rod 13 is completely surrounded by a conducting layer, so as to form the hollow wave guide 32. This will be described in more detail in FIG. 6.

Several directional coupling structures are well known in the art and a few examples of suitable implementations will be discussed with reference to FIGS. 4-6. The embodiments described in relation to FIGS. 4 and 5 are suitable in an implementation as disclosed in FIG. 2, where the dielectric rod acts as a surface wave guide (not surrounded by a conducting layer). The embodiment described in relation to FIG. 6, on the contrary, is suitable for an implementation as disclosed in FIG. 3, where the dielectric rod forms part of a hollow wave guide.

Figure 4A:
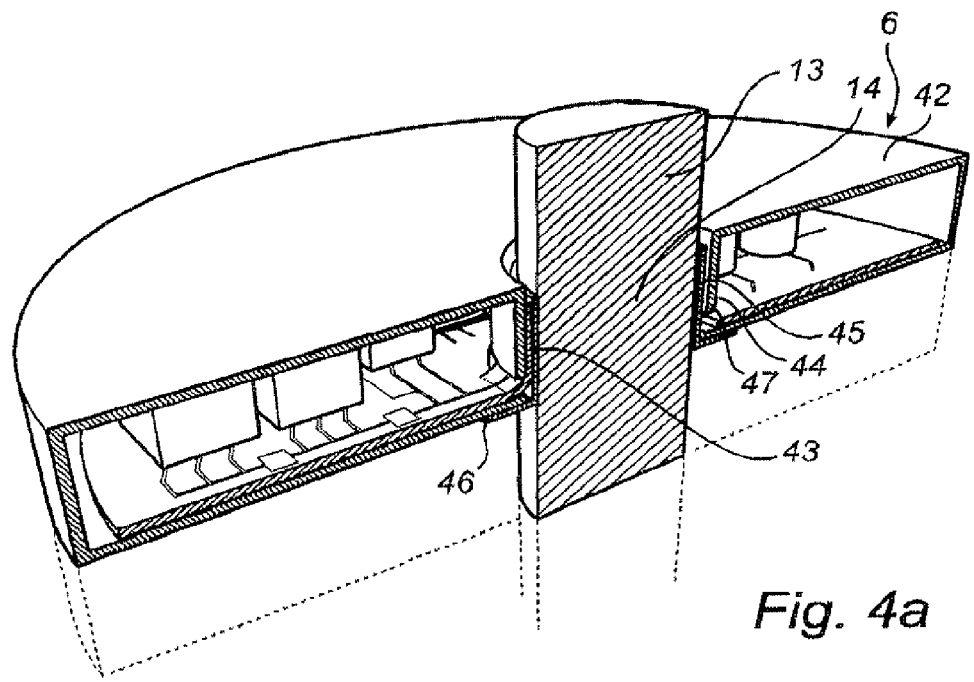
Figure 4B:
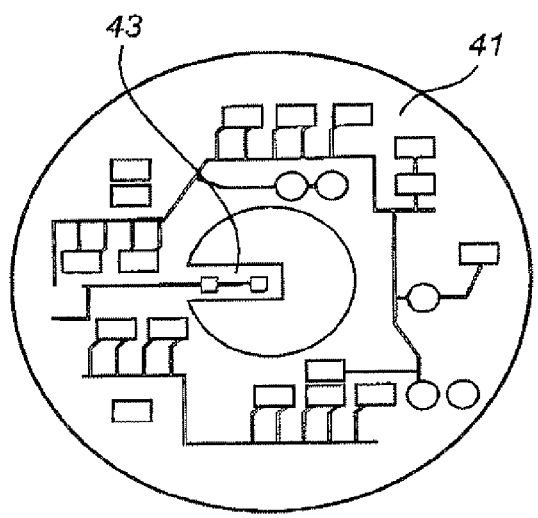
Figure 5A:
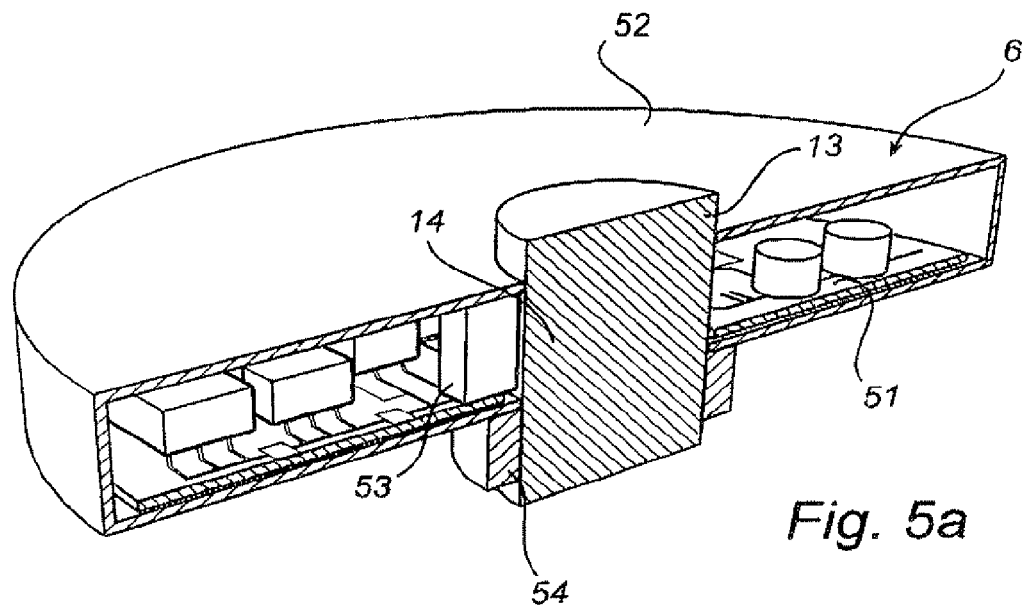

In FIG. 4a, each unit 6 includes a flexible printed circuit board (PCB) 41 supporting the required circuitry (e.g. transceiver circuitry and processing circuitry), which is housed in a housing 42 of non conducting material, such as plastic. The PCB 41 includes a lip portion 43 extending through an opening in the inner wall 44 of the housing, so as to extend into the opening 14. As illustrated in FIG. 4b, the lip 43 has a circuit path forming a transmission line a quarter wave length long. (The "wave length" here relates to the wave length in the rod material at the operating frequency of the radar level gauge.)

The lip 43 is bent so as to be arranged along the outer surface of the rod 13 when the unit 6 is mounted on the rod 13. The quarter wave transmission line will thus extend in the axial direction of the rod, and act as a directional coupling.

The bending of the lip 43 may be achieved by the rod 13 at the time of mounting, or by a separate sleeve 45 which may be inserted into the opening 14 before mounting. In this case the lip 43 will be sandwiched between the inner wall 44 and the sleeve 45. In order to allow bending of the PCB 41 with reduced risk of damage of the circuit pattern, the wall 44 may have a smooth lower edge 47, against which the flexible PCB 41 may rest.

The sleeve 45 may also advantageously act as a guide in the radial direction, ensuring a correct alignment of the unit 6 on the rod 13. The sleeve 45 may further include a flange portion 46 below the bottom of the housing 42, serving as a distance element between adjacent units 6 (corresponding to distance element 20 in FIG. 2).

In FIG. 5a, the unit 6 again includes a PCB 51 and a housing 52, similar to those in FIG. 4. In this embodiment, a coupling element 53 is mounted on the PCB so as to be located close to the dielectric rod 13 when the unit is mounted thereon. The coupling element 53 may be of a type known per se, and is adapted to provide a directional coupling of electromagnetic waves from the circuitry on the PCB 51 to the rod 13 acting as a surface wave guide. In order to ensure satisfactory coupling between the coupling element 53 and the rod 13, the housing 52 in this embodiment does not have any inner wall facing opening 14.

In order to ensure satisfactory guiding in the radial direction of the rod 13, the unit may further comprise a guiding sleeve 54, attached to the bottom of the housing 52.

Figure 5B:
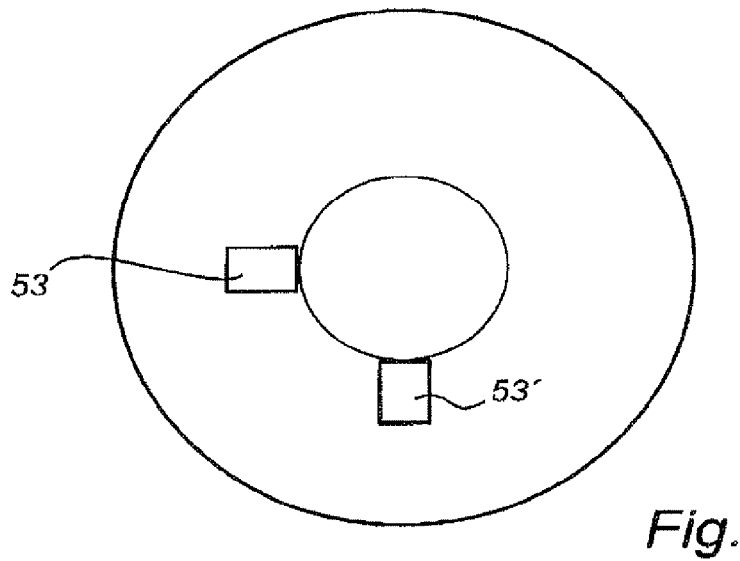

As indicated in FIG. 5b a second coupling element 53' may be arranged at 90 degrees with respect to the first element. Such an arrangement will enable transmission and reception of signals with circular polarization, which may be advantageous in some implementations.

In FIG. 6a, the unit 6 again includes a PCB 61 and a housing 62, similar to those in FIGS. 4 and 5, and again a coupling element 63 is mounted on the PCB so as to be arranged adjacent to the rod 13 when the unit is mounted thereon. In this embodiment, however, the dielectric coupling element comprises two feeding points 64, 65 having a vertical distance of a quarter wavelength, and arranged to protrude into the opening 14 of the unit 6. The two feeding points are fed 90 degrees out of phase, thereby ensuring transmission of electromagnetic waves in one direction.

The rod 13 is here provided with a groove 68, in which the feeding points 64, 65 may extend into. This grove will also act as a guide, ensuring correct radial orientation of the unit 6, as discussed above with reference to FIG. 2.

The direction of the transmitted waves will be from the feeding point leading in time (i.e. connected by the shortest transmission line) to the feeding point lagging in time (i.e. connected by the longest transmission line). For this reason, it may be advantageous to arrange the PCB 61 in the roof of the unit 6, so that the coupling element 63 protrudes downwards, toward the tank. The feeding point 65 located closest to the tank will then also be the feeding point with the longest transmission line to the PCB 61.

The housing 62 in this embodiment preferable includes a conducting inner wall 66, surrounding the opening 14. The feeding points 64, 65 then extend through openings in this sleeve 66, and are isolated therefrom.

The housing may further be provided with a conducting sleeve portion 67, arranged below the bottom of the housing 62. Just like the flange portion 46 in FIG. 4a, this sleeve 67 will act as a guide, ensuring correct alignment of the unit 6, and also as a distance element ensuring correct distance between adjacent units 6.

With conducting inner walls 66 and conducting sleeve 67, the units 6 will form a continuous conducting enclosure around the dielectric rod 13, thus creating a hollow wave guide, as discussed in relation to FIG. 3.

As indicated in FIG. 6b a second coupling element 63' with a second pair of feeding points 64' may be arranged at 90 degrees with respect to the first pair. In this case, the rod 13 of course needs to be provided with a second groove 68'. Similar to the embodiment in FIG. 5b, this allows transmission and reception of signals with circular polarization.

As illustrated in FIG. 4-6, the directional coupling structure 43, 53, 63 may be arranged on the same printed circuit board (PCB) 41, 51, 61 as the transceiver circuitry. The concentration of the coupling structure to one PCB may enable better performance (insulation and matching), and is relatively cost-effective and simple to produce. Thus, the collection of all critical microwave functions for each channel to one PCB is a very cost effective solution. Further, there is a very short microwave path from the TX/RX-modules to the antenna, which is an important property e.g. for good measuring performance at small distances.

The directional coupler structure should be designed for a suitable degree of coupling between the transceiver circuitry and the antenna. This can be quantified as the attenuation of an incoming upward wave (reflected signal) before it reaches the input on the PCB. This attenuation is a typical specification parameter of any directional coupler used as a component. In case of a rather weak coupling (such as −10 dB) the signal received by the lowest electronics unit will be decreased by −10 dB. At the next electronics unit the signal in the waveguiding structure is lower so the signal delivered to the second unit will be decreased by −10.5 dB. The third unit (if all three uses the same polarisation) will only receive −11 dB as the signal in the waveguide is still a bit weaker.

In order not to lose too much signal the coupling should be stronger but that will also decrease the signal to next unit. One way to get an optimum division of the available signal is to arrange a coupling which is different along the waveguide. With the coupling shown in FIG. 6a/6b this is fairly simple to arrange as the coupling is strongly dependent on the penetration dept of the probes 64. If the dielectric rod 13 is covered by a specially designed plastic sheet it can be arranged to be slightly excentric in a non-uniform way, so that the probes of the lowest unit has less penetration (=less coupling) than the next unit which in its turn has less coupling than the uppermost one if three are stacked. A suitable variation in coupling strength can typically be accomplished by varying the pentration depth in the order of 1 mm.

If the rod is designed for three identical electronic units the coupling may be arranged so that the lowest unit gets ¼ of the reflected echo from the antenna, the next unit ⅓ of the rest and the uppermost unit gets ½ of what is left. Then each unit and also the termination 15 gets ¼ each of the total signal power.

With two units stacked (with the same polarization) the sleeve can be arranged so that ⅓ of the power gets to the lowest unit and ½ of the rest to the upper unit. The two units and the termination in this case get ⅓ each.

For another optimization the sleeve can be designed have a strong coupling to the lowest unit and weaker to the second and third as the use for high level alarm is active at high level when the signal is strong.

Figure 1:
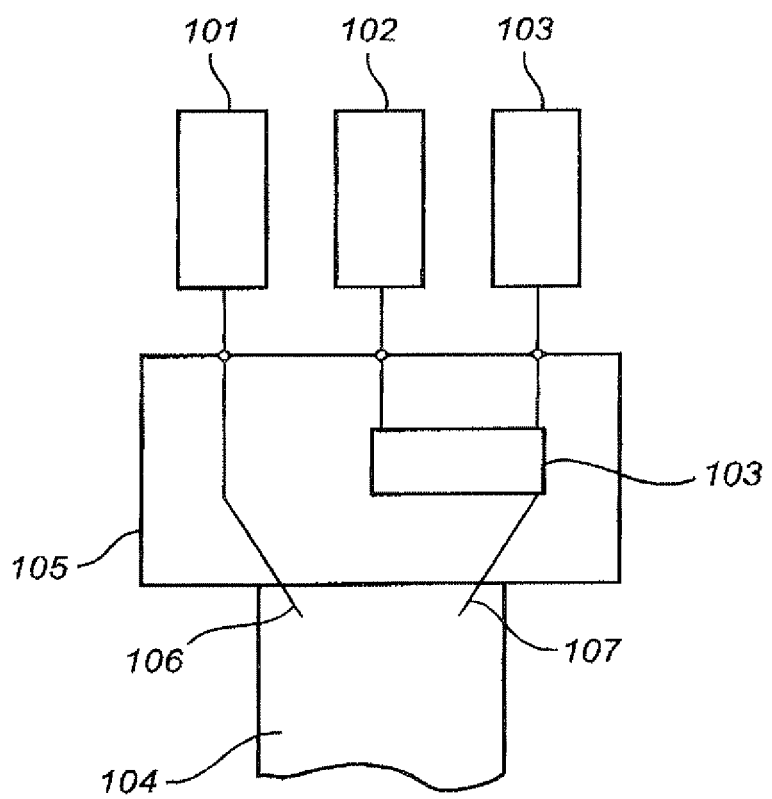
FIG. 1 is a schematic illustration of how several electronics units are connected to the same wave guide, according to prior art.
Figure 7:
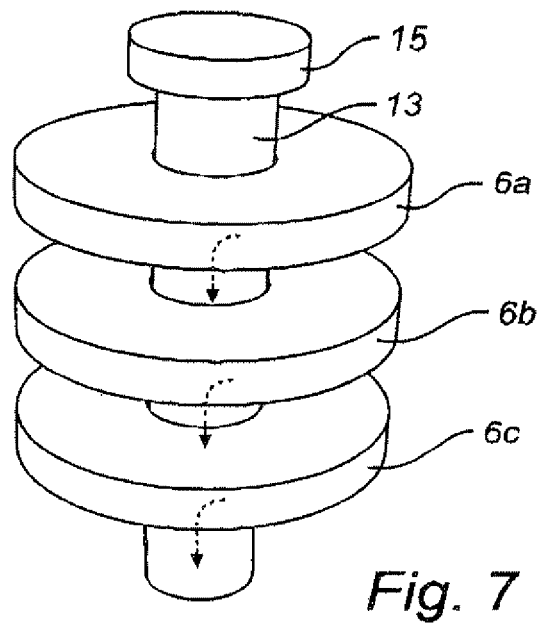
FIG. 7 is a schematic illustration of how several electronics units are connected to a waveguide according to an embodiment of the present invention.

FIG. 7 schematically illustrates the connection of three electronics units 6a, 6b, 6c to a common wave guide according to an embodiment of the present invention. Compared to the prior art illustrated in FIG. 1, the wave guide comprises the dielectric rod 13 which guides electromagnetic signals from all three electronics units 6 towards and antenna (not shown in FIG. 7). The directional coupling of each electronics unit 6 enables separation of each measurement channel associated with each unit 6 respectively.

In FIG. 7, two of the units 6a, 6b can be arranged to have different polarization (e.g. orthogonal linear polarization). The third unit 6c has the same polarization as one of the other units, and signals from this unit are preferably distinguishable from signals from the other units by means of a characteristic other than polarization. Such features include time and frequency. It is also possible that all three units employ the same polarization, such as left or right hand circular polarization.

The radar level gauge disclosed herein is easily mounted on a tank. First, the signal propagation device and the wave guiding strucuter are mounted to a suitable mounting structure in the roof of the tank, preferably a mounting flange intended for this purpose. The flange may be provided by a suitable sealing. The dielectric rod is arranged to extend essentially vertically from the roof of the tank, and on the rod one or several electronics units are mounted so that the rod extends through the opening in each unit. The directional couplers of each unit will then be secured in relation to the rod to enable directional coupling of signals transmitted from the unit and received from the tank. After installation, the unit(s) may easily be removed from the rod in the field without requiring special equipment, for maintenance or replacement.

In use, the transceiver circuitry transmits microwave signals which are coupled into the dielectric rod 13 by the directional coupler 43, 53, 63. The signals are guided through the rod 13 through the container roof 11 and to the antenna 8, 33, which emits the signals into the tank 2. The microwave signals propagate into the tank 2 and are reflected by any impedance transitions present in the tank. In particular, the microwaves are reflected by the surface 5 of the material 3 in the tank. This reflection is referred to as a surface echo.

The reflected microwaves, including any surface echo, is received by the antenna 8, 33, and guided by the wave guiding structure 9 back to the directional coupler 43, 53, 63, and transmitted via the transceiver circuitry to the processing circuitry. The processing circuitry determines the distance to the surface 5 based on transmitted and reflected signals. The received signals can be processed by a processor with software for analyzing the signals in order to determine the filling level, and the processor is preferably a microprocessor based circuit. The functions and algorithms implemented by the signal processor, some of which can be embodied in hardware and some of which can be embodied in software, may be per se known in the art and will not be discussed further in this application. The radar level gauge may be coupled to a remote location (for example a control room) via a signal wire or the like.

The person skilled in the art realizes that the present invention by no means is limited to the preferred embodiments described above. On the contrary, many modifications and variations are possible within the scope of the appended claims. For example, the geometric form and design of the electronics unit 6 may be different than the illustrated example, and may be for example rectangular, semi annular, or any other shape defining an opening through which the dielectric rod is insertable.

Further, the coupling of signals between the units 6 and the rod 13 may be achieved in alternative ways. In a case where the mounting portion of the electronics unit 6 is detachable from the circuitry portion, the mounting portion is arranged to allow the directional coupler to be in operational contact with the rod.

What is claimed is:

1. A radar level gauge using electromagnetic signals to determine a filling level of a product in a tank, comprising:
    first electronics unit comprising a first mounting portion and a first circuitry portion, said first circuitry portion including first transceiver circuitry for transmitting and receiving electromagnetic signals, first processing circuitry connected to said transceiver circuitry and adapted to determine said filling level based on a relation between transmitted and received signals, and a first directional coupler;
    a second electronics unit comprising a second mounting portion and a second circuitry portion, said circuitry portion including second transceiver circuitry for transmitting and receiving electromagnetic signals, second processing circuitry connected to said transceiver circuitry and adapted to determine said filing level based on a relation between transmitted and received signals, and a second directional coupler;
    wherein each electronics unit provides a functionally independent measurement channel;
    a signal propagation device arranged to direct electromagnetic signals into said tank and to return electromagnetic signals reflected from said tank; and
    a wave guiding structure arranged to guide said electromagnetic signals between said first and second electronics unit and said signal propagation device, said wave guiding structure comprising a rod of a dielectric material, a portion of said dielectric rod extending outside side tank,
    wherein each electronics unit is detachably mounted on said dielectric rod, said dielectric rod extending through an opening in said first mounting portion so as to be completely surrounded by said first mounting portion, and said dielectric rod extending through an opening in said second mounting portion so as to be completely surrounded by said second mounting portion, wherein said first and second electronics units are arranged axially separated along said dielectric rod, and wherein said first mounting portion is arranged to secure said first circuitry portion relative said dielectric rod so that said first directional coupler is in a position to couple signals between said first transceiver circuitry and said dielectric rod, and wherein said second mounting portion is arranged to secure said second circuitry portion relative said dielectric rod so that said second directional coupler is in a position to couple signals between said second transceiver circuitry and said dielectric rod.

2. A radar level gauge according to claim 1, wherein said dielectric rod is adapted to act as a surface wave guide.

3. A radar level gauge according to claim 2, wherein the signal propagation device is a rod antenna and the dielectric rod is an extension of the antenna.

4. A radar level gauge according to claim 1, wherein the lower tip of the dielectric rod is pointed, to form a matched transition between the wave guide and a horn antenna.

5. A radar level gauge according to claim 1, wherein said rod is surrounded by a conducting enclosure to form a hollow waveguide.

6. A radar level gauge according to claim 5, wherein a wall of said mounting portion delimiting said opening forms part of said conducting enclosure.

7. The radar level gauge according to claim 1, wherein each electronics unit is adapted to transmit linearly polarized radiation rotated 90 degrees with respect to each other, so that electromagnetic waves emitted from a first of these electronics units has a polarization orthogonal to electromagnetic waves transmitted from a second of these electronics units.

8. The radar level gauge according to claim 1, wherein each electronics unit is arranged to transmit electromagnetic waves having circular polarization.

9. The radar level gauge according to claim 1, wherein electromagnetic waves transmitted from said first electronics unit are distinguishable from electromagnetic waves transmitted from said second electronics unit by means of a feature other than polarization.

10. The radar level gauge according to claim 1, wherein each mounting portion has an annular shape with a substantially centrally located opening.

11. The radar level gauge according to claim 1, wherein said mounting portion and said circuitry portion are formed as one integrated unit.

12. The radar level gauge according to claim 1, further comprising a wave guide termination arranged in a distal end of said rod with respect to said signal propagation device, wherein said termination is adapted to absorb any microwave energy reaching said termination.

13. A method for assembling a radar level gauge according to claim 1, comprising:
providing a mounting structure for mounting in a roof of a tank,
attaching, to said mounting structure, said signal propagation device, and said wave guiding structure connected to said signal propagation device,
mounting said first mounting portion of said first electronics unit on said dielectric rod, so that said dielectric rod extends through said opening and so that said first circuitry portion is secured relative said dielectric rod so that said first directional coupler is in a position to couple signals between said first transceiver circuitry and said dielectric rod, and mounting said second mounting portion of said electronics unit on said dielectric rod, so that said dielectric rod extends through said opening and so that said second circuitry portion is secured relative said dielectric rod so that said second directional coupler is in a position to couple signals between said second transceiver circuitry and said dielectric rod.

14. The method according to claim 13, further comprising mounting said mounting structure in a roof of a tank, so that said dielectric rod extends substantially vertically from the roof.

15. A radar level gauge using electromagnetic signals to determine a filling level of a product in a tank, comprising:
a first electronics unit comprising a first mounting portion and a first circuitry portion, said first circuitry portion including first transceiver circuitry for transmitting and receiving electromagnetic signals, first processing circuitry connected to said transceiver circuitry and adapted to determine said filling level based on a relation between transmitted and received signals, and a first directional coupler;
a second electronics unit comprising a second mounting portion and a second circuitry portion, said circuitry portion including second transceiver circuitry for transmitting and receiving electromagnetic signals, second processing circuitry connected to said transceiver circuitry and adapted to determine said filling level based on a relation between transmitted and received signals, and a second directional coupler;
wherein each electronics unit provides a functionally independent measurement channel;
a signal propagation device arranged to direct electromagnetic signals into said said tank and to return electromagnetic signals reflected from said tank; and
a wave guiding structure arranged to guide said electromagnetic signals between said electronics unit and said signal propagation device, said wave guiding structure comprising a rod of a dielectric material, a portion of said dielectric rod extending outside said tank,
wherein each electronics unit is detachably mounted on said dielectric rod, said dielectric rod extending through an opening in said first mounting portion so as to be at least partially surrounded by said first mounting portion, and said dielectric rod extending through an opening in said second mounting portion so as to be at least partially surrounded by said second mounting portion,
wherein said first and second electronics units are arranged axially separated along said dielectric rod, and
wherein said first mounting portion is arranged to secure said first circuitry portion relative said dielectric rod so that said first directional coupler is in a position to couple signals between said first transceiver circuitry and said dielectric rod, and
wherein said second mounting portion is arranged to secure said second circuitry portion relative said dielectric rod so that said second directional coupler is in a position to couple signals between said second transceiver circuitry and said dielectric rod,
wherein said dielectric rod is adapted to act as a surface wave guide.

16. A radar level gauge according to claim 15, wherein the signal propagation device is a rod antenna and the dielectric rod is an extension of the antenna.

17. A radar level gauge according to claim 15, wherein the lower tip of the dielectric rod is pointed, to form a matched transition between the wave guide and a horn antenna.

18. The radar level gauge according to claim 15, wherein each electronics unit is adapted to transmit linearly polarized radiation rotated 90 degrees with respect to each other, so that electromagnetic waves emitted from a first of these electronics units has a polarization orthogonal to electromagnetic waves transmitted from a second of these electronics units.

19. The radar level gauge according to claim 15, wherein each electronics unit is arranged to transmit electromagnetic waves having circular polarization.

20. The radar level gauge according to claim 15, wherein electromagnetic waves transmitted from said first electronics unit are distinguishable from electromagnetic waves transmitted from said second electronics unit by means of a feature other than polarization.

21. The radar level gauge according to claim 15, wherein each mounting portion has an annular shape with a substantially centrally located opening.

22. The radar level gauge according to claim 15, wherein said mounting portion and said circuitry portion are formed as one integrated unit.

23. The radar level gauge according to claim 15, further comprising a wave guide termination arranged in a distal end of said rod with respect to said signal propagation device, wherein said termination is adapted to absorb any microwave energy reaching said termination.

24. A method for assembling a radar level gauge according to claim 15, comprising:
- providing a mounting structure for mounting in a roof of a tank,
- attaching, to said mounting structure, said signal propagation device, and said wave guiding structure connected to said signal propagation device,
- mounting said first mounting portion of said first electronics unit on said dielectric rod, so that said dielectric rod extends through said opening and so that said first circuitry portion is secured relative said dielectric rod so that said first directional coupler is in a position to couple signals between said first transceiver circuitry and said dielectric rod,
- and mounting said second mounting portion of said second electronics unit on said dielectric rod, so that said dielectric rod extends through said opening and so that said second circuitry portion is secured relative said dielectric rod so that said second directional coupler is in a position to couple signals between said second transceiver circuitry and said dielectric rod.

25. The method according to claim 24, further comprising mounting said mounting structure in a roof of a tank, so that said dielectric rod extends substantially vertically from the roof.

* * * * *